March 10, 1959 E. FITZER 2,877,114
METHOD OF PRODUCING SINTERED METALLIC BODIES
Filed Feb. 23, 1954

Inventor:
Erich Fitzer.
By [signature] Atty.

United States Patent Office 2,877,114
Patented Mar. 10, 1959

2,877,114

METHOD OF PRODUCING SINTERED METALLIC BODIES

Erich Fitzer, Vienna, Austria, assignor to Siemens-Plania-Werke Aktiengesellschaft fuer Kohlefabrikate, Meitingen, near Augsburg, Germany, a corporation of Germany Application February 23, 1954, Serial No. 411,950

Claims priority, application Austria February 26, 1953

7 Claims. (Cl. 75—223)

This invention is concerned with a method of producing molded or formed materials.

Powder metallurgical working methods have been extended to include metals difficult to form by pressing, also hard materials or oxides and various combinations of corresponding materials in powdered form, and such development has introduced new pressing or molding procedures.

It has now been found that formed or molded materials of metals and/or hard materials and/or oxides may be advantageously made by sintering if the molding or forming by pressing is carried out in conjunction with metals which are solid but which melt at sinter temperature or become volatile in the sinter atmosphere. In accordance with the invention, the molded part is subjected to sintering together with the metal formed therewith.

The new method offers the decided advantage of permitting the use of powdered materials which are difficult to press or mold and in part do not hold the edges, and to sinter such materials in desired form. The metals which are to be molded with the powdered material must be of a kind that melts or volatilizes only at a time when the formed powdered component is sufficiently sintered. Reaction between the metallic parts and the material to be sintered is of course to be avoided as far as possible.

The molding or pressing method according to the invention is not only suitable for the discontinuous molding procedures usually practiced in powder metallurgy and involving the use of matrices, but is over and above such use particularly adapted for continuous molding processes. Extrusion molding, for example, offers manifold possibilities for producing continuous formed or molded bodies with differently profiled surfaces and interior cavities by the use of corresponding cores and blanking members which are advantageously extruded simultaneously. Metals that are well formable, e. g., lead, tin, aluminum, copper, silver, soft iron, etc., are particularly suitable for the purpose.

The field of rolling for the purpose of forming bodies in powder metallurgical productions can be decisively extended by the new method. Only special metallic powders are known to be suitable for forming bodies by rolling. The present invention permits the use of rolling for forming, e. g., endless bands of various iron powders by carrying such powders between metallic sheets which are rolled therewith.

The invention also permits continuous production of formed bodies of desired length by introducing into the metallic forms lengths of material to be sintered spaced by metal pieces of the type contemplated by the invention.

It is also possible to use the new method for producing sinter materials having a defined volume of pores by admixing with the pulverized material to be sintered particles of metals which are volatilized during the sintering. Such skeleton sintered bodies are very well adapted, e. g., as saturation materials for receiving low melting alloys of colloidal oxide solutions, glass melts, etc. They also may be used as carriers for catalyzers or large surface electrodes, etc.

Figure 3:
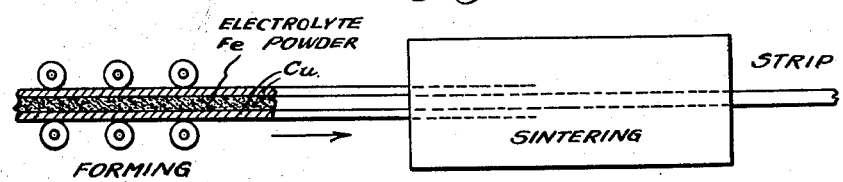
Figure 4:
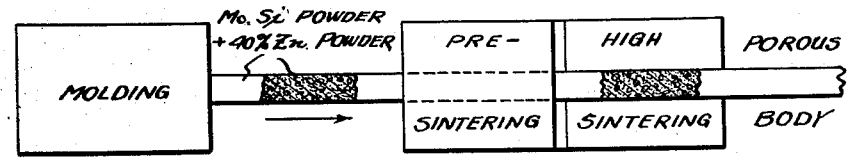

Fig. 3 illustrates another embodiment of my invention for a method of continuously forming a ferrous metallic powder between non-ferrous sheets and sintering to form a continuous strip; and, Fig. 4 illustrates still another embodiment of my invention for continuously molding a metallic powder with another metallic powder by pre-sintering in a reducing atmosphere and thereafter sintering at high temperature to form a continuous porous body.

Figure 1:
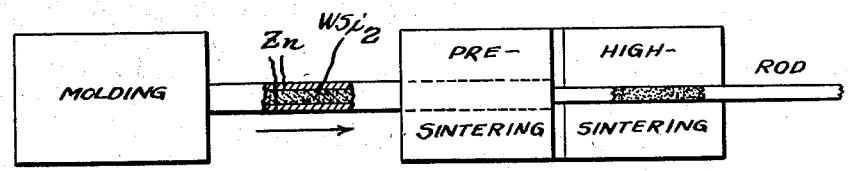
Fig. 1 illustrates schematically one embodiment of my invention for a method of continuously molding a powdered material in a metal shell by pre-sintering and high temperature sintering to form a continuous sintered rod.

The following examples are given to illustrate the invention:

Referring to Fig. 1, Example No. 1 will be described.

$WSi_2$-powder is formed or pressed in a profiled zinc shell as a rod and extruded with the zinc shell which gives it its form and carried to presintering in a hydrogen atmosphere at 1300° C. During the quick heating, the zinc vaporizes immediately while the profiled rod of $WSi_2$ has sufficient mechanical strength for being carried into the connecting high sinter zone.

Figure 2:
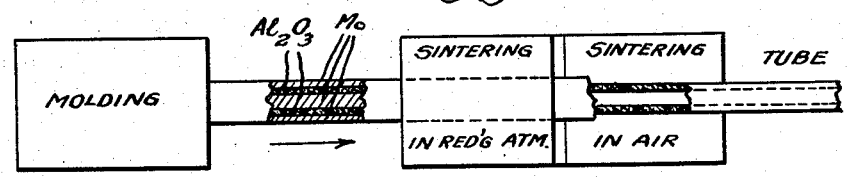
Fig. 2 illustrates another embodiment of my invention for a method of continuously molding a combined sinter material within a metal tube containing a metal wire core and thereafter sintering in a reducing atmosphere and in air to form a continuous tube.

Referring to Fig. 2, Example No. 2 will be described.

A combined chromium steel $Al_2O_3$ sinter material is formed within a molybdenum tube containing a molybdenum wire core and thereafter sintered in hydrogen and in air. The heat resisting molybdenum permits prolonged sintering in the reducing atmosphere even at highest sinter temperatures but will immediately vaporize in air as $MoO_3$ and thus leave a well sintered tubular formed body.

Referring to Fig. 3, Example No. 3 will be described.

Electrolyte iron powder is rolled between copper sheets to form an endless band covered on each side with copper. This rolled band is subjected to sintering at elevated temperature at which the copper sheets melt, yielding a firmly sintered iron band which absorbs the melting copper as a saturation material thus exhibiting high corrosion existence.

Referring to Fig. 4, Example No. 4 will be described.

$MoSi_2$ powder is molded with 40% by weight zinc powder and presintered in a hydrogen atmosphere. The zinc vaporizes and leaves a porous sintered body of sufficient mechanical strength which may be subsequently highly sintered without any difficulty, retaining its desired and predetermined porosity.

It is to be understood that suitable known apparatus may be used for all phases of the several methods disclosed.

The term "converted" or similar language as used in the claims, unless otherwise restricted, is intended to embrace all meanings denoting conversion of the material to which the term refers, including "melting," "volatilizing," "removal," "vaporization" and similar meanings. The term "formed" or similar language is intended to embrace the meaning ascribed to "molding" in all its various forms including extrusion molding, die molding, casting or pressing and the like.

What is believed to be new and desired to have protected by Letters Patent is defined in the appended claims.

I claim:

1. The method of producing sintered shaped metallic bodies of pulverulent hard materials difficult to form by molding, which comprises the steps: confining a mass of the pulverulent material in a metal casing having a melting temperature below the sintering temperature of said pulverulent material, compressing said metal casing with said material to form the shaped body, presintering the shaped body at a temperature to bind said mass into form sustaining condition and at which the metal casing is disintegrated by melting at the time when the formed pulverulent hard material is sufficiently sintered, so that the shaped body remains, and thereafter sintering the shaped and presintered body.

2. The method according to claim 1 wherein the material of said metal casing forms a shell encasing said pulverulent hard material.

3. The method according to claim 1, wherein the material of said metal casing forms a shell encasing a solid core of said pulverulent hard material.

4. The method according to claim 1, wherein the material of said metal casing forms a core extending through said pulverulent hard material and an outer shell encasing said latter material.

5. The method according to claim 1, wherein the material of said metal casing forms a shell encasing said pulverulent hard material and also is positioned within the latter to form a core element, said material of said metal casing being volatilized during sintering to achieve a body having a space therein corresponding to the volatilized material originally therein.

6. The method according to claim 1, wherein the pulverulent hard material is in strip form with said material of said metal casing being substantially in sheet form at opposite sides of the strip.

7. The method according to claim 1, wherein the material of said metal casing adapted to melt during the presintering penetrates into the presintered material as a saturation component thereof.

References Cited in the file of this patent

UNITED STATES PATENTS

| | | |
|---|---|---|
| 927,935 | Von Bolton | July 13, 1909 |
| 1,077,674 | Coolidge | Nov. 4, 1913 |
| 1,390,243 | Laise | Sept. 6, 1921 |
| 1,552,184 | Adams | Sept. 1, 1925 |
| 2,401,221 | Bourne | May 28, 1946 |
| 2,561,579 | Lenel | July 24, 1951 |
| 2,625,452 | Haller | Jan. 13, 1953 |
| 2,628,166 | Haller | Feb. 10, 1953 |
| 2,759,846 | Vosler | Aug. 21, 1956 |